US009652093B2

(12) United States Patent
Roberts et al.

(10) Patent No.: US 9,652,093 B2
(45) Date of Patent: May 16, 2017

(54) TOUCH SENSORS AND TOUCH SENSING METHODS

(71) Applicant: TouchNetix Limited, Hampshire (GB)

(72) Inventors: Stephen William Roberts, Winchester (GB); Peter Timothy Sleeman, Fareham (GB); Christopher Kyle Ard, Chandlers Ford (GB)

(73) Assignee: TouchNetix Limited, Hampshire (GB)

( * ) Notice: Subject to any disclaimer, the term of this patent is extended or adjusted under 35 U.S.C. 154(b) by 16 days.

(21) Appl. No.: 14/432,231

(22) PCT Filed: Oct. 8, 2013

(86) PCT No.: PCT/GB2013/052614
§ 371 (c)(1),
(2) Date: Mar. 30, 2015

(87) PCT Pub. No.: WO2014/057252
PCT Pub. Date: Apr. 17, 2014

(65) Prior Publication Data
US 2015/0242028 A1  Aug. 27, 2015

(30) Foreign Application Priority Data
Oct. 8, 2012 (GB) ................................. 1217948.7

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ....... G06F 3/044; G06F 3/0416; G06F 3/0418
See application file for complete search history.

(56) References Cited

U.S. PATENT DOCUMENTS 7,877,707 B2 * 1/2011 Westerman ......... G06F 3/04883
715/863
8,593,428 B1 * 11/2013 Peterson ................. G06F 3/044
324/686

(Continued)

FOREIGN PATENT DOCUMENTS

WO  2007/094993 A1  8/2007
WO  2010/147692 A1  12/2010

OTHER PUBLICATIONS

International Search Report and Written Opinion for corresponding patent application No. PCT/GB2013/052614 dated Dec. 12, 2013.

(Continued)

*Primary Examiner* — Patrick F Marinelli
(74) *Attorney, Agent, or Firm* — Renner, Otto, Boisselle & Sklar, LLP

(57) ABSTRACT

A touch-sensitive position sensor is disclosed. The sensor comprises an array of first electrodes and an array of second electrodes arranged to cross one another in a pattern to define a sensing surface. The sensing surface has a rectangular shape which is formed into a cylinder such that first and second opposing edges of the sensing surface are adjacent one another. A controller is coupled to respective ones of the first electrodes and the second electrodes and arranged to measure changes in an electrical parameter, e.g. capacitance or resistance, associated with the first and second electrodes caused by the presence of the object adjacent the sensing surface. The controller is further operable to determine a reported position for the object from these measurements in a coordinate system defined relative to the electrodes. At least some of the electrodes are arranged to follow paths which are non-linear within the sensing surface such that object positions along a straight line between the first and second opposing edges on the sensing surface correspond with reported positions along a closed curve in (Continued)

the coordinate system defined relative to the electrodes. Thus, a continuous movement around a circumference of the cylindrical sensing surface is reported as a continuous movement around a closed path in the coordinate system defined relative to the electrodes.

14 Claims, 8 Drawing Sheets

(56) References Cited

U.S. PATENT DOCUMENTS

| | | | |
|---|---|---|---|
| 9,588,614 B2* | 3/2017 | Roberts | G06F 3/0416 |
| 2004/0061687 A1* | 4/2004 | Kent | G06F 3/045 |
| | | | 345/173 |
| 2004/0252109 A1* | 12/2004 | Trent, Jr. | G06F 3/03547 |
| | | | 345/174 |
| 2005/0110768 A1* | 5/2005 | Marriott | G06F 3/03547 |
| | | | 345/173 |
| 2006/0077183 A1* | 4/2006 | Studt | G06F 3/0416 |
| | | | 345/173 |
| 2006/0097991 A1* | 5/2006 | Hotelling | G06F 3/0416 |
| | | | 345/173 |
| 2008/0006453 A1* | 1/2008 | Hotelling | G06F 3/044 |
| | | | 178/18.06 |
| 2008/0289045 A1* | 11/2008 | Fryer | G06F 21/14 |
| | | | 726/26 |
| 2009/0002337 A1 | 1/2009 | Chang | |
| 2010/0301879 A1* | 12/2010 | Philipp | G06F 3/03547 |
| | | | 324/679 |
| 2010/0315337 A1* | 12/2010 | Ferren | G06F 1/169 |
| | | | 345/158 |
| 2011/0141053 A1* | 6/2011 | Bulea | G06F 3/0416 |
| | | | 345/174 |
| 2011/0227868 A1 | 9/2011 | Chen et al. | |
| 2011/0248954 A1* | 10/2011 | Hamada | G06F 3/03547 |
| | | | 345/174 |
| 2012/0019449 A1* | 1/2012 | Yilmaz | G06F 3/044 |
| | | | 345/173 |
| 2015/0028894 A1* | 1/2015 | Sleeman | G06F 3/044 |
| | | | 324/662 |
| 2015/0234527 A1* | 8/2015 | Roberts | G06F 3/0416 |
| | | | 345/174 |
| 2015/0242028 A1* | 8/2015 | Roberts | G06F 3/044 |
| | | | 345/173 |
| 2017/0010743 A1* | 1/2017 | Fisher, Jr. | G06F 1/1626 |

OTHER PUBLICATIONS

Search Report for corresponding GB Application No. 1217948.7 dated Feb. 20, 2013.
Examination Report for corresponding GB Application No. 1217948.7 dated Sep. 17, 2014.

* cited by examiner

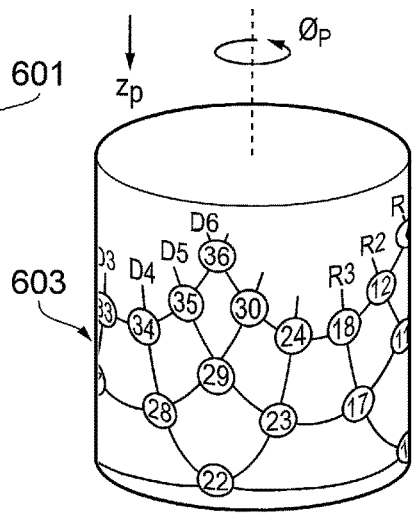
FIG. 6C
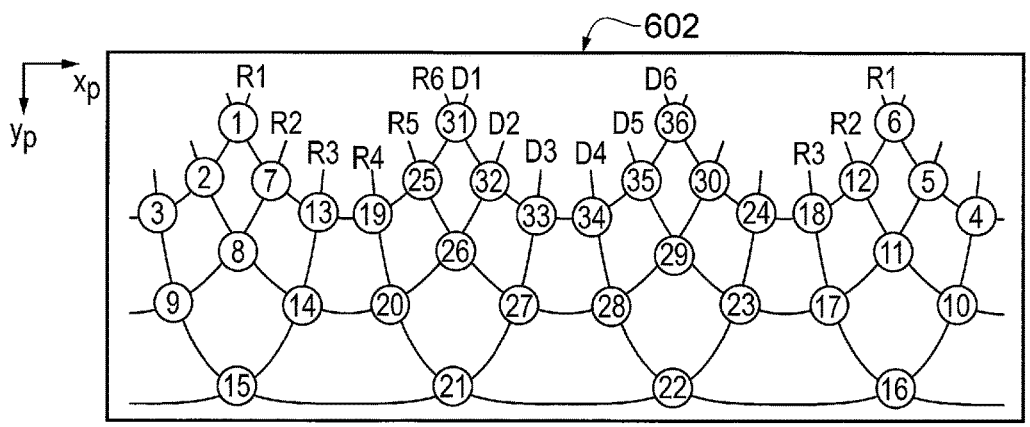
FIG. 6B
FIG. 6A
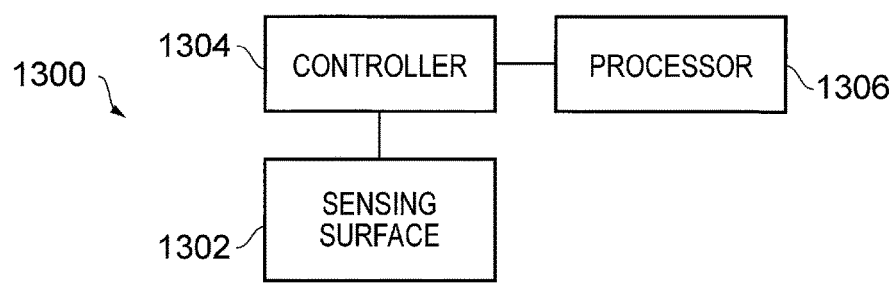
FIG. 13

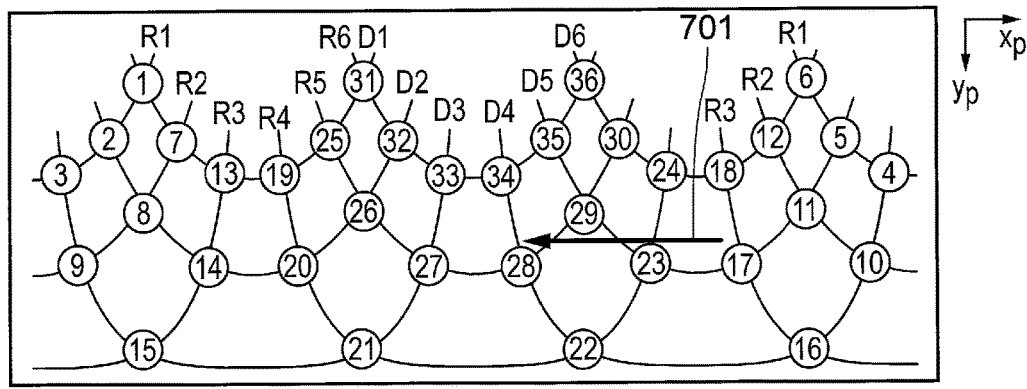
FIG. 7B
FIG. 7A
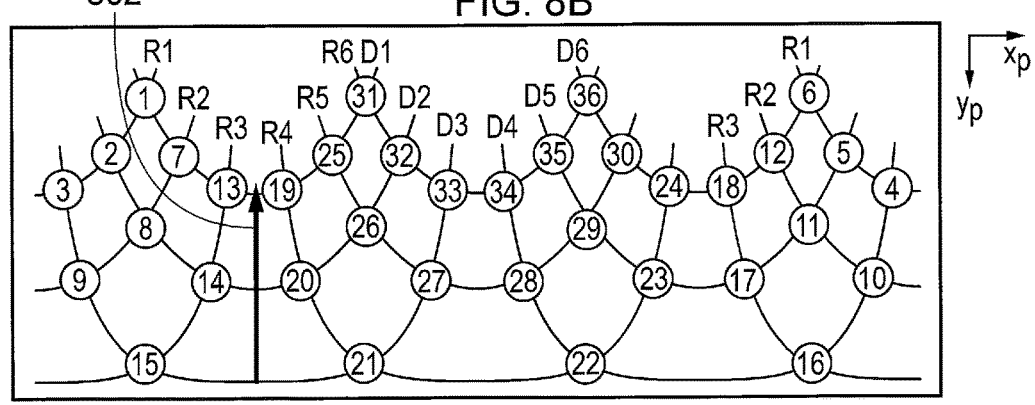
FIG. 8B
FIG. 8A

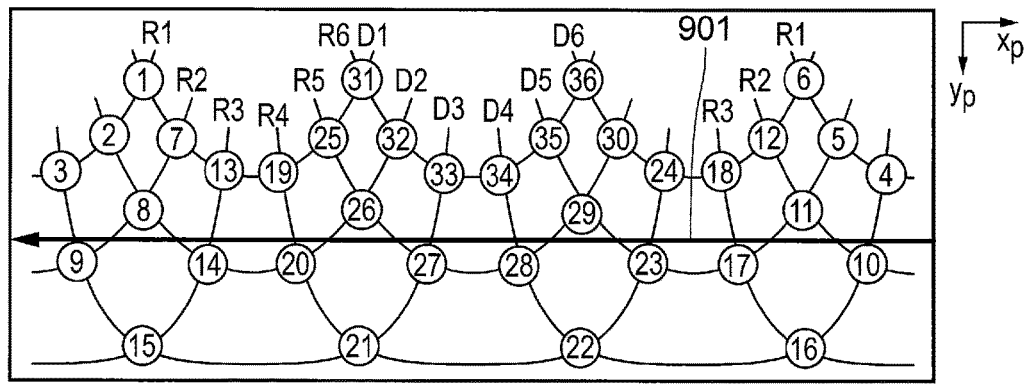
FIG. 9B
FIG. 9A
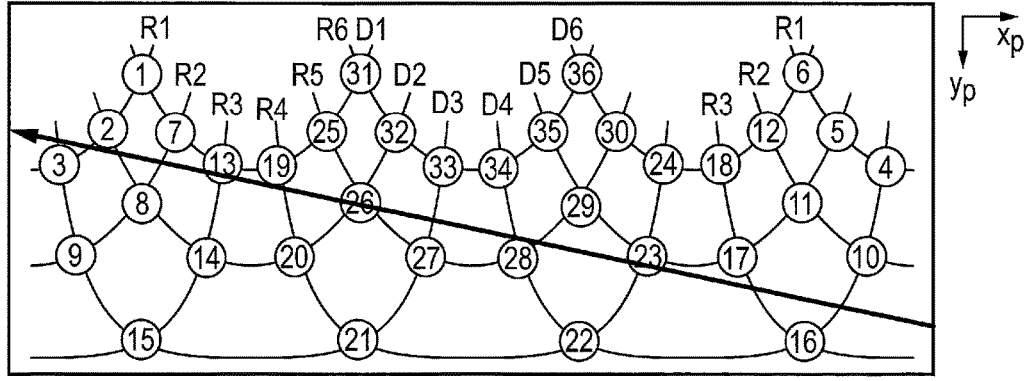
FIG. 10B
FIG. 10A

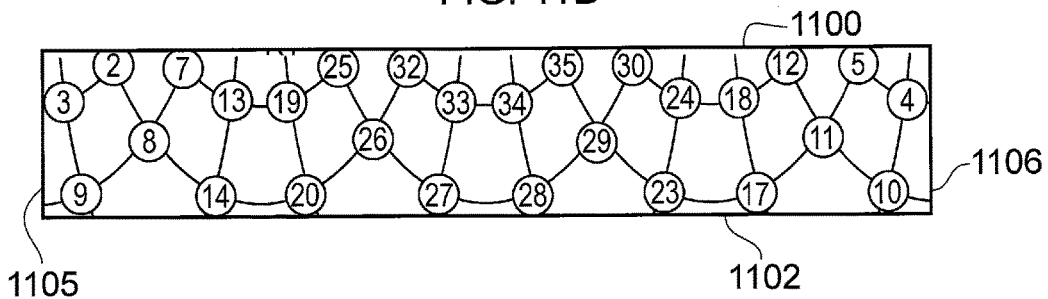
FIG. 11B
FIG. 11A
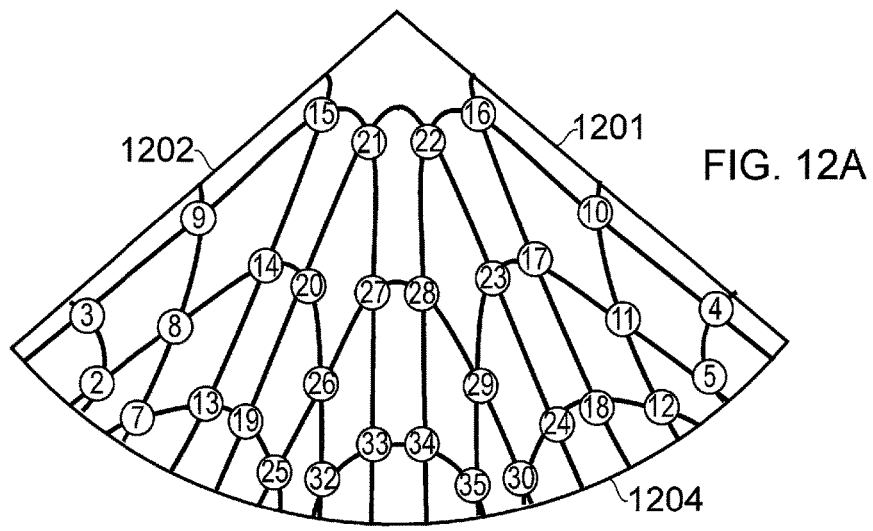
FIG. 12B
FIG. 12A

TOUCH SENSORS AND TOUCH SENSING METHODS

This application is a national phase of International Application No. PCT/GB2013/052614 filed Oct. 8, 2013 and published in the English language.

BACKGROUND OF THE INVENTION

The present invention relates to the field of touch sensors, including touch screens and touch pads, and their associated control chip(s). In particular, embodiments of the invention relate to designs for electrode patterns for such sensors for sensing the presence of one or more touching objects in a sensing area arranged across a three-dimensional surface A capacitive touch sensor can be generalised as one that uses a physical sensor element comprising an arrangement of electrically conductive electrodes extending over a touch sensitive area (sensing area) and a controller chip connected to the electrodes and operable to measure changes in the electrical capacitance of each of the electrodes or the mutual-capacitance between combinations of the electrodes.

FIG. 1 schematically shows principal components of a generic conventional capacitive touchscreen comprising a physical sensor element 100. The touch screen is represented in plan view (to the left in the figure) and also in cross-sectional view (to the right in the figure).

The touch screen is configured for establishing the position of a touch within a two-dimensional sensing area by providing Cartesian coordinates along an X-direction (horizontal in the figure) and a Y-direction (vertical in the figure). In this example the sensor element 100 is constructed from a substrate 103 that could be glass or plastic or some other insulating material and upon which is arranged an array of electrodes consisting of multiple laterally extending parallel electrodes, X-electrodes 101, and multiple vertically extending parallel electrodes, Y-electrodes 102, which in combination allow the position of a touch 109 to be determined. To clarify the terminology, and as will be seen from FIG. 1, the X-electrodes 101 are aligned parallel to the X-direction and the Y-electrodes 102 are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named after their direction of extent rather than the direction along which they resolve position.

In some cases, each electrode may have a more detailed structure than the simple "bar" structures represented in FIG. 1, but the operating principles are broadly the same. The electrodes, which are sometimes called traces, are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided in lieu of a mouse in laptop computers is usually opaque, and hence can use lower cost copper electrodes and an epoxy-glass-fibre substrate (e.g. FR4). Referring back to the figure, the electrodes are electrically connected via circuit conductors 104 to a controller chip 105, which is in turn connected to a host processing system 106 by means of a communication interface 107. The host 106 interrogates the controller chip 105 to recover the presence and coordinates of any touch or touches present on, or proximate to the sensor 103. In the example, a front cover (also referred to as a lens or panel) 108 is positioned in front of the sensor 103 and a single touch 109 on the surface of the cover 108 is schematically represented.

Note that the touch itself does not generally make direct galvanic connection to the sensor 103 or to the electrodes 102. Rather, the touch influences the electric fields 110 that the controller chip 105 generates using the electrodes 102. With appropriate analysis of relative changes in the electrodes' measured capacitance/capacitive coupling, the controller chip 105 can thus calculate a touch position on the cover's surface as an XY coordinate 111. The host system can therefore use the controller chip to detect where a user is touching, and hence take appropriate action, perhaps displaying a menu or activating some function.

There are many different material combinations and electrode configurations to allow creation of a touch screen and the example discussed above is just one.

A further aspect of capacitive touch sensors relates to the way the controller chip uses the electrodes of the sensor element to make its measurements. There are two main classes of controller in this regard.

A first class is known as a "self-capacitance" style. Reference is made to FIG. 2. In this design of a capacitive sensor, the controller 201 will typically apply some electrical stimulus (drive signal) 202 to each electrode 203 which will cause an electric field to form around it 204. This field couples through the space around the electrode back to the controller chip via numerous conductive return paths that are part of the nearby circuitry 205, product housing 206, physical elements from the nearby surroundings 207 etc., so completing a capacitive circuit 209. The overall sum of return paths is typically referred to as the "free space return path" in an attempt to simplify an otherwise hard-to-visualize electric field distribution. The important point to realise is that the controller is only driving each electrode from a single explicit electrical terminal 208; the other terminal is the capacitive connection via this "free space return path". The capacitance measured by the controller is the "self-capacitance" of the electrode (and connected tracks) relative to free space (or Earth as it is sometimes called) i.e. the "self-capacitance" of the electrode. Touching or approaching the electrode with a conductive element 210, such as a human finger, causes some of the field to couple via the finger through the connected body 213, through free space and back to the controller. This extra return path 211 can be relatively strong for large objects (such as the human body), and so can give a stronger coupling of the electrode's field back to the controller; touching or approaching the electrode hence increases the self-capacitance of the electrode. The controller is configured to sense this increase in capacitance. The increase is strongly proportional to the area 212 of the applied touch and is normally weakly proportional to the touching body's size (the latter typically offering quite a strong coupling and therefore not being the dominant term in the sum of series connected capacitances).

In a classic self-capacitance sensor the electrodes are arranged on an orthogonal grid, generally with a first set of electrodes on one side of a substantially insulating substrate and the other set of electrodes on the opposite side of the substrate and oriented at nominally 90° to the first set. There are also structures where the grid is formed on a single side of the substrate and small conductive bridges are used to allow the two orthogonal sets of electrodes to cross each other without short circuiting. One set of electrodes is used to sense touch position in a first axis that we shall call "X"

and the second set to sense the touch position in the second orthogonal axis that we shall call "Y".

In a self-capacitance touch sensor, the controller can either drive each electrode in turn (sequential) or it can drive them all in parallel. In the former sequential case, any neighbouring electrodes to a driven electrode are sometimes grounded by the controller to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the controller can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the controller if there is a voltage difference between the electrodes).

The second class of controller is known as a "mutual-capacitance" style. Reference is made to FIG. 3. In this design of a capacitive sensor the controller 301 will sequentially stimulate each of an array of transmitter (driven/drive) electrodes 302 that are coupled by virtue of their proximity to an array of receiver electrodes 303. The resulting electric field 304 is now directly coupled from the transmitter to each of the nearby receiver electrodes; the "free space" return path discussed above plays a negligible part in the overall coupling back to the controller chip when the sensor is not being touched. The area local to and centred on the intersection of a transmitter and a receiver electrode is typically referred to as a "node". Now, on application or approach of a conductive element 305 such as a human finger, the electric field 304 is partly diverted to the touching object 305. An extra return path to the controller 301 is now established via the body 306 and "free-space" in a similar manner to that described above. However, because this extra return path acts to couple the diverted field directly to the controller chip 301, the amount of field coupled to the nearby receiver electrode 303 decreases. This is measured by the controller chip 301 as a decrease in the "mutual-capacitance" between that particular transmitter electrode and receiver electrodes in the vicinity of the touch. The controller senses this change in capacitance of one or more nodes. The magnitude of a capacitance change is nominally proportional to the area 307 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

In a classic mutual-capacitance sensor the transmitter electrodes and receiver electrodes are arranged as an orthogonal grid, with the transmitter electrodes on one side of a substantially insulating substrate and the receiver electrodes on the opposite side of the substrate. This is as schematically shown in FIG. 3. It should be understood that discussion of a single unitary substrate does not preclude use of a multi-layer substrate which can sometimes be advantageous for cost, ease of fabrication or for other reasons. In FIG. 3 a first set of transmitter electrodes 303 is shown on one side of a substantially insulating substrate 308 and a second set of receiver electrodes 302 is arranged at nominally 90° to the transmitter electrodes on the other side of the substrate. There are also structures where the grid is formed on a single side of the substrate and small insulating bridges are used to allow the transmitter and receiver electrodes to cross each other without short circuiting.

By using interpolation between adjacent nodes for both types of capacitive touch sensor a controller chip can typically determine touch positions to a greater resolution than the spacing between electrodes. Also there are established techniques by which multiple touches within a sensing area, and which might be moving, can be uniquely identified and tracked, for example until they leave the sensing area.

It will be appreciated that conventional position-sensitive touch sensors are generally configured to provide a position measurements as a Cartesian coordinate within a two-dimensional sensing space which is defined relative to the X- and Y-electrodes. Accordingly, commercially-available capacitive sensing controller chips (ICs) are generally designed to interface to linear arrays of straight sensor electrodes, or X and Y electrodes, in a flat, two-dimensional plane.

In some cases a conventional X-Y grid electrode layout coupled to a conventional controller may not be desired for a particular implementation. This might be, for example because a more complex sensing surface is desired, or because of restrictions on the way in which physical connections can easily be made between a controller and sensor electrodes.

With the above issues in mind there is a need for alternative sensor designs providing for more flexibility in respect of different shapes of sensing surface and connectability between sensor electrodes and control circuitry.

SUMMARY OF THE INVENTION

According to a first aspect of the invention there is provided a touch-sensitive position sensor comprising: an array of first electrodes and an array of second electrodes arranged in a pattern to define a sensing surface; and a controller coupled to respective ones of the first electrodes and the second electrodes and arranged to determine a reported position for an object adjacent the sensing surface in a coordinate system defined relative to the first electrodes and the second electrodes by measuring changes in an electrical parameter associated with the first electrodes and the second electrodes which is caused by the presence of the object; and wherein at least some of the first electrodes and the second electrodes are arranged to follow paths which are non-linear within the sensing surface such that object positions along a straight line on the sensing surface correspond with reported positions along a curve in the coordinate system defined relative to the first electrodes and second electrodes.

In accordance with some embodiments the first electrodes and second electrodes are arranged such that object positions along a straight line from one edge of the sensing surface to an opposite edge of the sensing surface correspond with reported positions along a path comprising a revolution about an origin in the coordinate system defined relative to the first electrodes and second electrodes.

In accordance with some embodiments the path comprising a revolution about an origin in the coordinate system defined relative to the first electrodes and second electrodes is a closed path.

In accordance with some embodiments the first electrodes and second electrodes are arranged such a straight line on the sensing surface intersects with respective ones of the first electrodes and second electrodes at more than one location.

In accordance with some embodiments opposing ends of respective ones of the first electrodes meet a common edge of the sensing surface and/or opposing ends of respective ones of the second electrodes meet a common edge of the sensing surface.

In accordance with some embodiments opposing ends of respective ones of the first electrodes and opposing ends of respective ones of the second electrodes meet a common edge of the sensing surface.

In accordance with some embodiments respective ones of the first electrodes and/or respective ones of the second electrodes are generally U-shaped within the sensing surface.

In accordance with some embodiments object positions along another straight line on the sensing surface correspond with reported positions along a straight line in the coordinate system defined relative to the first electrodes and second electrodes.

In accordance with some embodiments the coordinate system defined relative to the first electrodes and second electrodes is a Cartesian coordinate system and the controller is further operable to transform a reported position in this Cartesian coordinate system to reported position in a polar coordinate system having an origin within the Cartesian coordinate system.

In accordance with some embodiments the sensing surface is curved to form a three-dimensional shape.

In accordance with some embodiments the sensing surface comprises a generally rectangular-shaped surface formed into a cylinder with a first edge of the sensing surface adjacent an opposite edge of the sensing surface.

In accordance with some embodiments the sensing surface comprises a generally wedge-shaped surface formed into a cone with a first edge of the sensing surface adjacent an opposite edge of the sensing surface.

In accordance with some embodiments the electrical parameter relates to a capacitive coupling associated with the respective electrodes.

In accordance with some embodiments the capacitive coupling is a capacitive coupling between respective ones of the first electrodes and respective ones of the second electrodes.

In accordance with some embodiments the electrical parameter relates to a resistance associated with the electrodes.

According to another aspect of the invention there is provided a method of sensing a position of an object adjacent a sensing surface comprising: providing an array of first electrodes and an array of second electrodes arranged in a pattern on the sensing surface; determining a reported position for the object in a coordinate system defined relative to the first electrodes and the second electrodes by measuring changes in an electrical parameter associated with the first electrodes and the second electrodes caused by the presence of the object, wherein at least some of the first electrodes and the second electrodes are arranged to follow paths which are non-linear within the sensing surface such that object positions along a straight line on the sensing surface correspond with reported positions along a curve in the coordinate system defined relative to the first electrodes and second electrodes.

Embodiments of the invention may thus provide a class of electrode pattern that can be used to provide a continuous, gap-free touch response around curved surfaces. These electrode patterns can be interfaced with standard touch controllers without modification, but with the touch controller output interpreted in a new way. A sub-group of electrode patterns can be manufactured on a flat, inelastic sheet and subsequently curved into shape. In accordance with embodiments of the invention electrodes providing a sensing surface can if desired be accessed (connected to) from a single edge of the pattern.

In accordance with some embodiments of the invention there is provided a touch sensor element designed to be used with a commercially-available touch controller and to be formed to partially enclose a three dimensional, rotationally-symmetric volume. The electrodes of this sensor element are arranged such that movement of a sensed touch in any circumferential direction on the surface of the enclosed volume is reported by the touch controller as a circular movement about an origin within the touch controller's report-space.

Consequentially, the movement of a sensed touch in any direction perpendicular to the circumference on the surface of the enclosed volume is reported by the touch controller as a radial movement about this origin.

In accordance with some embodiments a full revolution of a sensed touch about the partially enclosed volume results in a continuous, full revolution of position reported by the touch controller.

In accordance with some embodiments the scaling factor between the length of all touch movements perpendicular to the circumference on the surface of the sensor and the length of the radial movement reported by the touch controller is constant and independent of position on the sensor element.

In accordance with some embodiments the scaling factor between the length of all touch movements perpendicular to the circumference on the surface of the sensor and the length of the radial movement reported by the touch controller varies depending upon the axial position of the touch on the surface of the sensor element.

In accordance with some embodiments the sensor element is manufactured in a flat, two-dimensional sheet and subsequently bent into the required form.

In accordance with some embodiments joined edges of the sensor have electrical connections for continuity of the electrodes.

In accordance with some embodiments the sensor element is manufactured in the final three-dimensional form.

In accordance with some embodiments the sensor electrodes' shapes are not constant along their lengths but vary in such a way to change their capacitance properties.

In accordance with some embodiments the sensor electrodes' shapes change such that all of the node capacitance properties within the sensor are within a narrower range of values as required to be operated by commercially-available touch controllers.

In accordance with some embodiments all electrode connections are along one edge.

In accordance with some embodiments the sensor element is formed to cover a cylindrical curved surface.

In accordance with some embodiments the sensor element is formed to cover a conical curved surface.

In accordance with some embodiments the sensor element is formed to cover a surface having a single axis of rotational symmetry and only one circular opening into its interior.

BRIEF DESCRIPTION OF THE DRAWINGS

The invention is now described by way of example only with reference to the following drawings in which:

FIGS. 6A to 6C schematically represent some aspects of a mutual-capacitance touch sensor according to an embodiment of the invention including a schematic electrodes as a flat sheet and transformed into a cylinder, and a coordinate space for reported positions relative to the electrodes;

FIGS. 7 to 10 schematically shows how various physical movements across a sensing surface may be reported by a touch sensor controller in accordance with embodiments of the invention;

FIGS. 11 and 12 schematically show some aspects of touch sensors according to other embodiments of the invention.

DETAILED DESCRIPTION

In some touch-sensor applications there may be a desire to sense the position of a touch on a surface of a three three-dimensional object, such as the surface of a cylinder. Taking the concept of touch sensing from two-dimensional to three-dimensional surfaces, an issue arises of how to make sensor electrode patterns suitable for use on three-dimensional surfaces in a way which is compatible with commercially-available sensor controllers which are designed to resolve touches on rectangular planes of finite extent.

One particular sensing configuration which is desirable is one in which the position of a touch around a curved cylindrical surface can be determined. This type of arrangement may be used, for example, to in effect provide a touch-sensitive equivalent of a conventional rotary dial. Instead of rotating a physical knob, a user might thus simply "twist" their fingers around a fixed knob. Such a design may be preferable to a conventional rotary dial because it would not require any moving parts, which are often relatively expensive and prone to failure, as well as providing a more pleasing user-interface.

Figure 4:
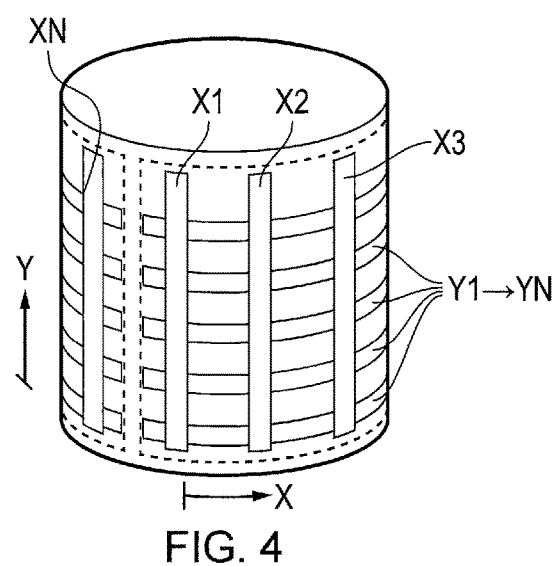
FIG. 4 schematically shows one approach for forming a cylindrical sensing surface from a conventional flat touch sensor.

One potential implementation of a touch-sensitive rotary control based around a cylindrical touch sensor can be provided by in effect wrapping a conventional two-dimensional touch sensor around a cylindrical surface. This would result in a sensor comprising an array of electrodes running parallel to an axis of the cylinder (i.e. arranged longitudinally) and an orthogonal array of electrodes running around the cylinder's circumference (i.e. arranged circumferentially). Such a design is schematically shown in FIG. 4. Here it is assumed the longitudinally arranged electrodes are X-electrodes and the circumferentially arranged electrodes are Y-electrodes. A conventional controller coupled to such an electrode arrangement will readily report an X- and a Y-coordinate whereby a reported Y-coordinate for a touch thus corresponds with a measured "height" of a touch along the cylinder whilst a reported X-coordinate for a touch corresponds with a measured position azimuthally around curved surface of the cylinder.

Thus, the arrangement of FIG. 4 comprises two perpendicular arrays of straight electrodes, but rolled into a cylinder such that theXelectrodes run parallel with the cylindrical axis and the Y electrodes run around its circumference. Assuming there are N X-electrodes numbered from 1 to N, electrode number 1 (X1) would be adjacent to both X electrode number 2 (X2) and X electrode number N (XN). That is to say, the first X electrode X1 is adjacent the last X electrode XN because the rectangular sensing area curved around the cylinder so that two opposite edges are adjacent one another.

By connecting the electrode arrangement of FIG. 4 to a commercially-available touch controller it is possible to sense that a user is gripping the rotary control and to recognise various gestures on the cylindrical surface. A drawback of this approach, however, is that a commercially-available touch controller will be operating on the assumption that electrodes X1 and XN are at opposite ends of a sensing area and so will be unable to take account of the fact these electrodes are adjacent one another when the sensing area is wrapped to form a cylindrical sensing surface. Accordingly, the controller would not recognise that an extended touch detected by both X1 and XN might be a part of the same feature. The controller would thus determine there to be two separate touches at opposite ends of the touchscreen, rather than recognising these as a single touch and interpolating a centroid position between them across the joined edge. A consequence of this is that a touch that crosses from X1 to XN will be interpreted as a first touch exiting the sensor at an edge adjacent electrode X1 followed by a new touch entering the sensor at the opposite page adjacent electrode XN, as opposed to the continuous movement of one touch. Hence if this linear/perpendicular sensor is used with an existing, commercially-available touch controller, the information regarding touch position during a rotational gesture will be less easy to interpret and will likely have a disjoint response in the vicinity of the abutting edges of the sensor substrate, for example because of the need to "feed out" connections from the electrodes to the controller.

Some embodiments of the invention are directed towards addressing this issue by providing sensor electrode patterns that map touch movement along a circumferential line on the surface of a rotationally-symmetrical body onto a curved path within a touch-controller's coordinate system defined relative to the X- and Y-electrodes. One application of such sensor patterns is for rotary control such as discussed above and in which a nominally flat sensing area is wrapped around a cylinder to form a 3D sensing surface. In accordance with some embodiments of the invention the electrode pattern is arranged such that a touch moving around a complete circumference of the cylindrical sensor surface is reported as a closed loop, for example a circle, in the conventional controller's coordinate system. Thus a touch that is moving around the circumference of the cylindrical surface would not cross the edge of the touch controller's rectangular sensing area. This helps address the above-described issue with continuously tracking a touch around a complete circumference of the central sensing area.

Within the context of embodiments of the invention two coordinate systems may be considered.

One coordinate system may be referred to as a "physical" coordinate system and relates to the "real world" position of an object adjacent a sensing surface. For example, a physical coordinate system may be used to represent the position of a touch in terms of a number of centimetres from a reference point, or in terms of an angular distance around a curved surface from a defined reference point.

Another coordinate system may be referred to as a "reported" coordinate system and relates to the position of an object adjacent a sensing surface as reported in a coordinate system defined relative to the sensor electrodes. For example, a reported coordinate system may be used to represent the position of a touch in terms of which sensor electrodes are in the vicinity of where the touch is detected. A controller for a sensor chip will typically output a position in such a "reported" coordinate system (since the controller will naturally calculate positions relative to the electrodes).

Figure 1:
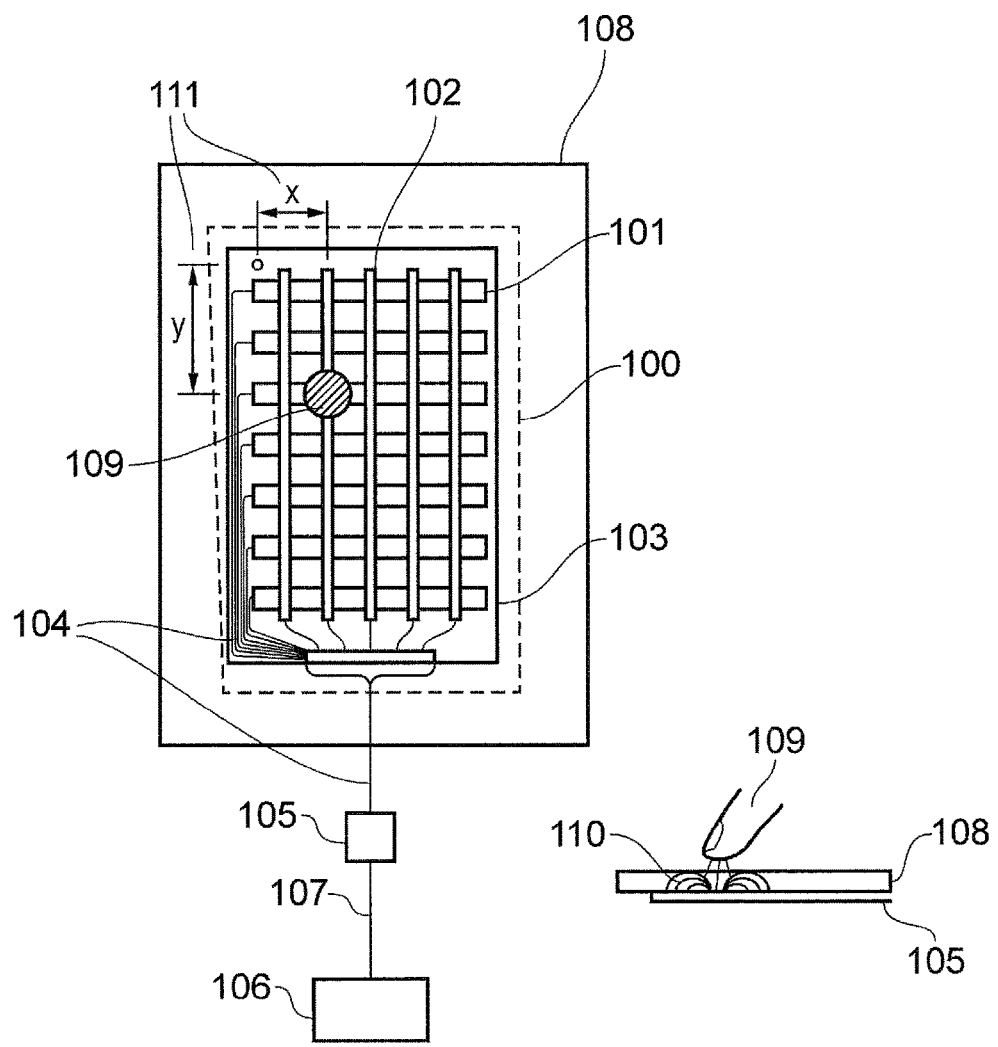
FIG. 1 illustrates a typical touchscreen/touch sensor system.
Figure 2:
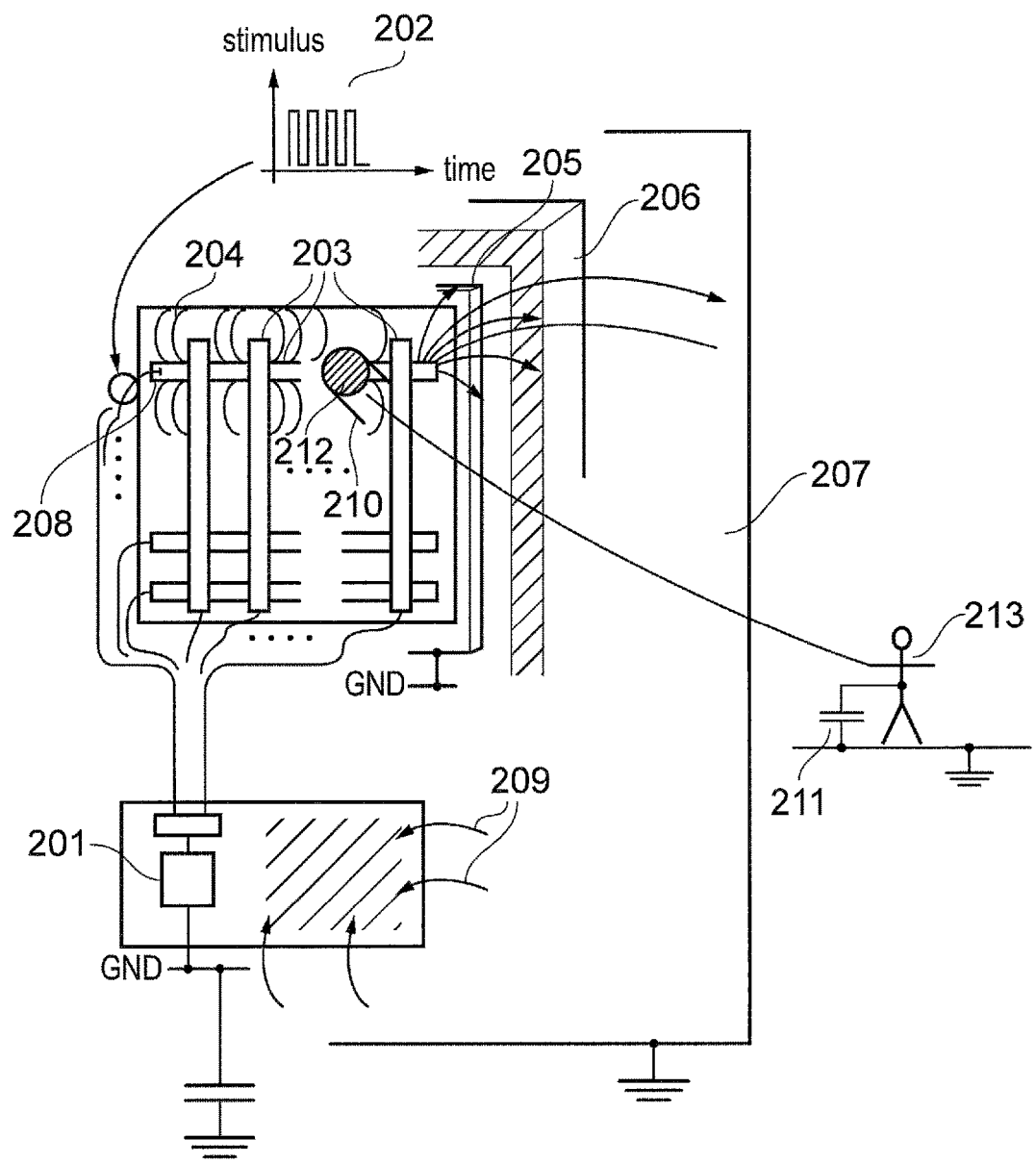
FIG. 2 illustrates a typical self-capacitance type touchscreen system.
Figure 3:
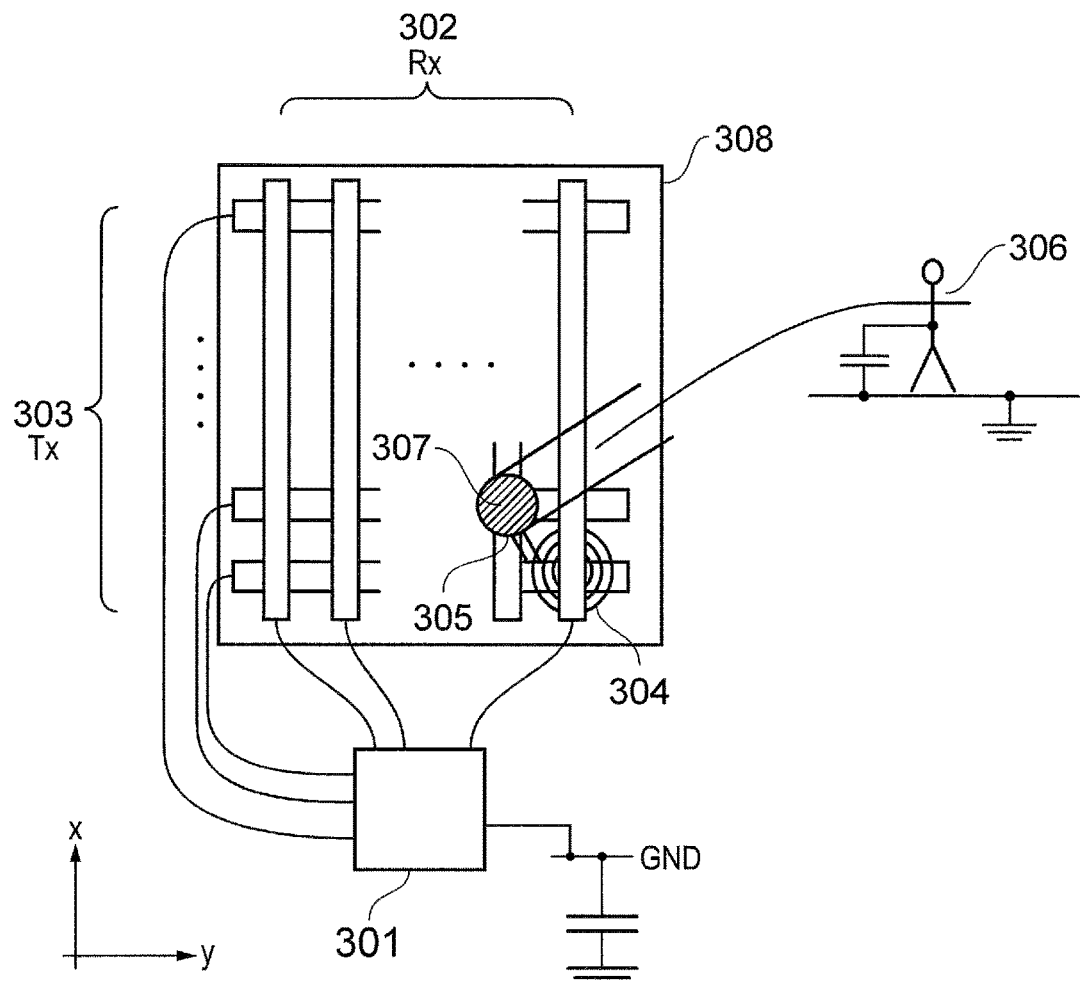
FIG. 3 illustrates a typical mutual-capacitance type touchscreen system.

Referring to FIG. 1 by way of example, the (interpolated centroid) position of the touch 109 may be defined within a physical coordinate system as being at a position of 2.4 centimeters from the left-hand edge of the sensing area and 3.6 centimeters from the top edge of the sensing area. Thus in this example the physical coordinate system is a regular Cartesian coordinate system having an origin at the top left corner of the sensing area and with distance is measured in units of centimeters (of course other origins and units may be used).

Alternatively, the (interpolated centroid) position of the touch 109 may equally be defined within a reported coordinate system as being around the intersection of the third-from-top X-electrode and the second-from-left Y-electrode. Thus in this example the reported coordinate system is again a regular Cartesian coordinate system having an origin at the top left corner of the sensing area and with distance is measured in units of electrode separations.

In some respects the physical coordinate system may be seen as defining the location of a touch in "real space" whereas the reported coordinate system may be seen as defining the location of a touch in "controller space". For a conventional electrode pattern and controller chip, such as represented in FIG. 1, the relationship between the physical (or real-world) coordinate system and the reported (or controller) coordinate system is based around a simple linear scaling of the units use to define position (and a translational offset if different origins are employed). Thus a location $(x_r, y_r)$ in the controller's reported coordinate system may be transformed into a location $(x_p, y_p)$ within the sensing surface's physical coordinate system by simply multiplying $x_r$ and $y_r$ by a scaling factor based on how physically far apart the respective electrodes are.

In accordance with some embodiments of the invention touch sensitive position sensors are provided having electrode patterns which are not arranged on a regular Cartesian grid. For example, electrode patterns are provided which comprise an array of first electrodes and an array of second electrodes arranged to provide a sensing surface comprising sensing nodes at locations where respective ones of the first electrodes and the second electrodes intersect/cross, and wherein at least some of the first electrodes and/or the second electrodes are non-linear within the sensing area. As a consequence of these configurations, the positions of touches (objects) determined by a conventional sensor controller coupled to the sensor electrode pattern in coordinate space differ from the physical positions of the touches relative to the physical sensing surface by more than a simple linear scaling. As explained further below, the approach of embodiments of the invention has been found to provide alternative electrode patterns having characteristics which can address some of the issues identified above.

Figure 5:
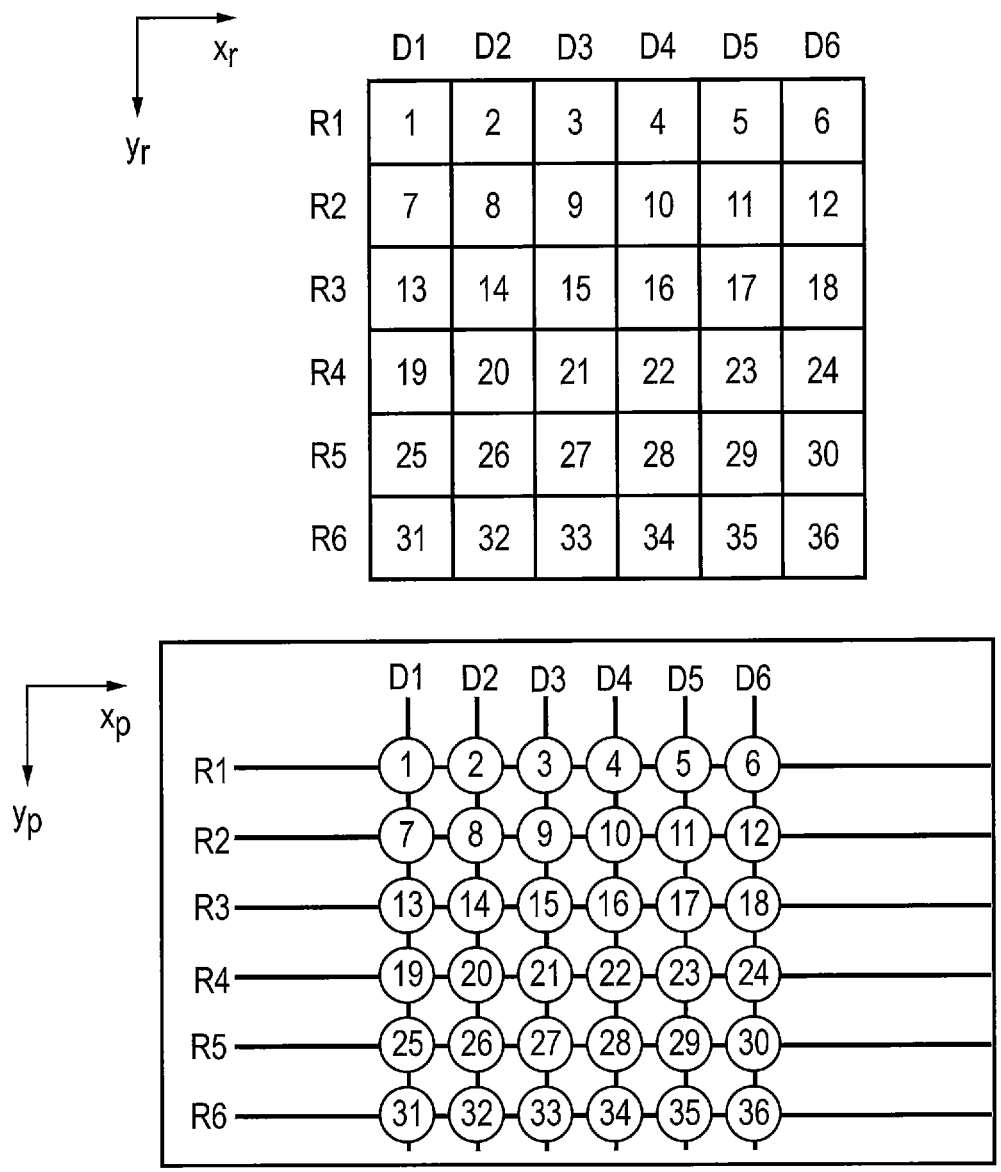
FIG. 5 schematically shows some aspects of a conventional capacitive touch sensor including a schematic array of electrodes and a coordinate space for reported positions relative to the electrodes.

FIG. 5 schematically shows various aspects of a conventional capacitive touch sensor. In this example the capacitive touch sensor is assumed to be based on a mutual-capacitance sensing technique in which a sensing surface 102 is defined by an orthogonal grid of six "receive" electrodes (labelled R1 to R6) and six "drive" electrodes (labelled D1 to D6), as schematically represented in the lower part of FIG. 5. These electrodes may be coupled to a conventional touch sensor controller configured to appropriately apply signals to the drive electrodes D1 to D6 and to measure corresponding signals received on the receiver electrodes R1 to R6 in the usual way. As is well established, this type of sensor is primarily sensitive to the location of objects in the vicinity of the respective intersections between the receive electrodes and the drive electrodes. In this regard, the sensing surface may be considered to comprise 36 sensing nodes corresponding to the various intersection/crossing points as labelled in the figure. The presence of an object near to a given sensing node will cause a change in the mutual-capacitance between the respective drive and receiver electrodes in the vicinity of this node. A centroid of changes in the mutual-capacitance for a group of neighbouring nodes may be interpolated to establish a touch position with a precision that is significantly higher than the characteristic electrode spacing.

The upper part of FIG. 5 schematically represents the reported position coordinate system for the controller coupled to the sensor. Here the controller is operable to output an indication of the position of an object relative to the locations of the various sensing nodes (i.e. in a coordinate system defined relative to the electrodes). There are various ways in which the position may be reported. For example, an object identified as being exactly above node 17 might be identified as having coordinates $(x_r, y_r)=(5, 3)$. Here $x_r$ is a measure of where the object/touch is determined to be relative to the drive electrodes (i.e. $x_r=5$ indicates the position of the touch in the X-direction of the reported coordinate system is directly above drive electrodes D5) while $y_r$ is a measure of where the object/touch is determined to be relative to the receive electrodes (i.e. $y_r=3$ indicates the position of the object/touch in the y-direction of the reported coordinate system is directly above receive electrodes R3). As noted above, it is well established that conventional controllers can "interpolate" positions. Thus an object having a location determined to be midway between nodes 28, 29, 34 and 35 might be reported by the controller as having coordinates $(x_r, y_r)=(4.5, 5.5)$ in reported coordinate space (i.e. the coordinate space defined relative to the electrodes).

As discussed above, the relationship between the reported position for an object $(x_r, y_r)$ in reported coordinate space and the actual position of an object against the sensing surface in physical space $(x_p, y_p)$ is generally a simple linear scaling based around the size of the spacing between electrodes.

Embodiments of the invention will now be described which are assumed to be based around a mutual-capacitance touch sensor comprising six drive electrodes and six receive electrodes and which may be controlled by a conventional controller such as one which may be used in conjunction with the conventional Cartesian-grid electrode layout shown in FIG. 5. However, as will be apparent, a significant aspect of embodiments of the invention is that the electrodes are non-linear within the plane of the sensing surface. Nonetheless, in accordance with embodiments of the invention a sensing surface having non-linear electrodes may be coupled to a broadly conventional-type controller (i.e. the controller does not "know" the electrodes are not arranged on a conventional regular Cartesian grid).

FIGS. 6A to 6C schematically represent some aspects of a mutual-capacitance touch sensor according to an embodiment of the invention. FIG. 6A represents an electrode pattern comprising a first array of six drive electrodes (D1 to D6) and a second array of six receive electrodes (R1 to R6) arranged on a physical sensing surface 602 so as to provide 36 sensing nodes at the respective intersections between the drive and receive electrodes. The electrodes are arranged so that the sensing nodes define a generally rectangular sensing surface/area. In this example it is assumed the sensing area to be formed around a cylinder to in effect provide a touch-sensitive rotary knob 603, as schematically shown in FIG. 6C. The sensor may be manufactured in accordance with any known techniques for providing touch sensor electrodes on a suitable substrate/physical surface. For example, the electrode pattern may be initially formed on a flat flexible substrate which is then physically curved to provide the cylindrical shape represented in FIG. 6C. Alternatively, electrodes may be deposited directly on a cylindrical surface such that FIG. 6A in fact represents the sensing surface as if it were unrolled in an abstract geometric sense, even though it might not be possible to unroll the actual physical sensing surface (because it is fixed to a 3D surface).

Signals applied to and measured from the electrodes D1 to D6 and R1 to R6 may be controlled by a conventional-type touch-sensor controller, such as might be used for driving the conventional touch sensor schematically represented in FIG. 5 in order to establish the locations of touches/objects relative to the electrodes in a broadly conventional fashion. Thus, a controller coupled to the electrodes is arranged to output an estimated position for a touch/object in a reported coordinate space as schematically represented in FIG. 6B (i.e. the conventionally-operating controller "assumes" the nodes are arranged on a regular Cartesian grid as is conventional, although in fact they are not). In effect, and as discussed above, the controller is configured to establish where an object is located relative to the drive electrodes and the receive electrodes. Thus, referring to FIGS. 6A and 6C, if a touch is adjacent sensing node 28, a controller coupled to the electrodes will report the location of the touch as being at coordinates $(x_r, y_r)=(4,5)$ in the reported coordinate system represented in FIG. 6B—i.e. adjacent the intersection of drive electrode D4 and receive electrode R5.

As discussed above, a significant aspect of the electrode pattern in FIG. 6A is that the electrodes are not arranged on a regular Cartesian grid, but are non-linear within the plane of the sensing area. A result of this arrangement is that a physical location of an object adjacent the sensing area in a physical coordinate system defined relative to the "real world" sensing surface, for example in a physical Cartesian coordinate system $(x_p, y_p)$ defined within the generally rectangular plane of the "un-rolled" sensing surface as represented in FIG. 6A, or in a physical cylindrical coordinate system $(\theta_r, z_p)$ defined within the surface of the "rolled" sensing surface as represented in FIG. 6C, does not linearly map to a reported position in the reported coordinate system $(x_r, y_r)$ with fixed scaling. In particular, a straight line of physical touch positions in the physical coordinate system of the actual sensing surface are reported as a curved line by the controller in the reported coordinate system defined relative to the electrodes. (It will be appreciated the physical-space Cartesian coordinate system $(x_p, y_p)$ defined within the generally rectangular plane of the "un-rolled" sensing surface as represented in FIG. 6A is closely related to the physical-space cylindrical coordinate system $(\theta_p, z_p)$ defined within the "rolled" sensing surface as represented in the upper right FIG. 6C. In particular, $y_p$ is linearly related to $z_p$ and $x_p$ is linearly related to $\theta_p$.)

In the example of FIG. 6A, respective ones of the drive electrodes D1 to D6 and the receive electrodes R1 to R6 are curved into generally U-shaped patterns within the plain of the sensing surface (it will be appreciated a U-shape having a relatively acute point so that it also resembles a V-shape may nonetheless be referred to as having a U-shape form within the present context). Thus, the electrodes in this example are curved so that respective ends of the respective electrodes point towards a common edge of the sensing area, namely the upper edge of the sensing area as represented in FIGS. 6A and 6B. This means a straight line across the sensing surface (for example corresponding to the movement of an object around a circumference of the cylinder represented in FIG. 6C) will intersect respective ones of the electrodes at two locations.

As can be seen from FIG. 6A, some of the electrodes (i.e. electrodes R1, R2 and R3) are "broken" across the left and right edges of the generally rectangular sensing area. These edge-crossing electrodes are "re-joined" when the sensing area is formed into a cylinder as represented in FIG. 6C (i.e. the respective electrodes intersect opposing edges of the sensing area at around the same height along the respective edges). It will, however, be appreciated there is no need for the electrodes to be physically connected to one another in the vicinity of the joined edge when the sensing area is rolled into a cylinder since the two portions of the respective electrodes either side of the join can be connected outside the sensing area by an external link (i.e. external to the sensing surface) between their respective ends which intersect the upper edge of the sensing area as represented in FIG. 6A. In an example where the electrode pattern is deposited directly on a three dimensional cylindrical surface (as opposed to being initially formed on a flat surface which is curved to form a cylinder), there is no need for a physical joined edge in the electrode pattern and the individual electrodes can all be deposited continuously across the central surface in the appropriate pattern.

As an example, the specific electrode pattern of 6A may be generated so as to cause straight lines in the direction of $x_p$ in FIG. 6A to be represented as circles centred on the grid represented in FIG. 6B in accordance with the following algorithmic principles:

Set $x_p$ and $y_p$ to be proportional to the angle and radius parts respectively of the polar coordinates in the reported space (assuming the origin is in the centre of the grid represented in FIG. 6B):

$$x_p = A \cdot \tan^{-1}(y_r/x_r) \text{ [angle]} \quad \text{(Ex1)}$$

$$y_p = B \cdot \text{sqrt}(x_r^2 + y_r^2) \text{ [radius]} \quad \text{(Ex2)}$$

In order to create the line for an electrode we need an expression in the form $y_p = f(x_p)$. In the case of the D electrodes we rearrange Ex1 to find:

$$y_r = x_r \cdot \tan(x_p/A) \quad \text{(Ex3)}$$

Substitute Ex3 into Ex2:

$$y_p = B \cdot x_r \cdot \text{sqrt}(1 + \tan^2(x_p/A)) \quad \text{(Ex4)}$$

Simplify:

$$y_p = B \cdot x_r / \cos(x_p/A) \quad \text{(Ex5)}$$

[Note that 1/cos=sec, or secant]

Thus the D electrodes in FIG. 6A respectively follow secant curves. It can readily be shown the R electrodes in this example are also secant curves.

Having described the electrode arrangement for the sensor represented in FIGS. 6A to 6C according to an embodiment of the invention, the manner in which various touches/ movements of touches across the physical sensing surface are reported by a conventional controller coupled to the sensing surface are now described.

FIG. 7A schematically shows the same representation of the sensing surface as shown in FIG. 6A. However, also schematically shown in FIG. 7A as a heavy arrow is an indication of an example physical path 701 of an object tracking across the sensing surface. The physical path 701 may correspond, for example, to a path taken by a user's finger tracking across the sensing surface. As can be seen in FIG. 7A, the example physical path 701 is generally parallel to the long edges of the rectangular sensing area (i.e. at fixed $y_p$ in the physical Cartesian coordinate system defined relative to the "unrolled" sensing surface) and moves right to left over approximately one quarter of the extent of the sensing surface. In terms of the movement of the user's finger adjacent the actual sensing area in its cylindrical form (e.g. as shown in FIG. 6C), this movement corresponds with an approximate quarter turn around the circumference of the cylindrical sensing surface at a fixed height.

FIG. 7B corresponds with FIG. 6B but additionally represents the reported path 702 of the example physical path 701 represented in FIG. 7A. As discussed above, because the electrodes are curved, the straight line physical path 701 within the plane of the sensing surface is reported as a curved path by the controller in the reported coordinate system defined relative to the electrodes.

As will be appreciated, locations along the curved path 702 as reported by the controller can readily be converted from reported Cartesian coordinates $(x_r, y_r)$ to reported polar coordinates $(r_r, \theta_r)$ about the centre 703 of the Cartesian coordinate space defined by the electrodes as represented in FIG. 6B. With the curved electrode pattern of the touch sensor represented in FIGS. 6 and 7 causing a physical object path around a circumference of the cylindrical sensing surface to map to a curve in the reported coordinate space as represented in FIG. 7B, a simple relationship between a reported position in reported polar coordinates $(r_r, \theta_r)$ and a physical position in physical cylindrical coordinates $(\theta_p, r_p)$ on the cylindrical sensing surface can be established.

In particular, the physical azimuthal angle $\theta_p$ of a touch on the cylindrical sensing surface corresponds linearly with the reported azimuthal angle $\theta_r$ of the touch as determined by converting the reported Cartesian coordinates to reported polar coordinates about the centre of the reported coordinate space as discussed above. For example, if an azimuthal origin for the physical cylindrical coordinate system associated with the cylindrical sensing surface is defined as the line which bisects the receive electrodes R1, R2 and R3 (i.e. where the ends of the unrolled sensing surface as represented in FIG. 7A are joined to form the cylindrical sensing surface), and the azimuthal origin for the reported polar coordinate system defined as the line extending directly upwards from the centre of the reported coordinate space represented in FIG. 7B (i.e. the line bisecting receive electrodes R1, R2 and R3 in report space), the two azimuthal angles are equivalent.

Similarly, the physical height $r_p$ of a touch on the cylindrical sensing surface corresponds linearly with the reported radius $r_r$ of the touch as determined in the polar coordinate system defined relative to the electrodes.

Thus, a conventional controller coupled to an electrode pattern according to an embodiment of the invention provides a reported position output which can very readily be associated with a physical position on a physical sensing surface. This therefore provides a simple way to provide an indication of position of a touch about a touch-sensitive control knob.

For example, a conventional controller might output a reported touch position in Cartesian coordinates $(x_r, y_r)$ which can be readily converted to polar coordinates about an origin at the centre of the reported touch space, which in turn directly correspond with an azimuthal position around the physical cylindrical sensing surface and a height along the physical cylindrical sensing surface. These coordinate may then be taken as an indication of a position of an object about the cylindrical sensing surface (control knob) and appropriate action taken according to the specific implementation at hand. For example a determined rotary motion around the sensing surface may be interpreted as an instruction to scroll through a menu, while a motion upwards or downwards within the sensing surface may be taken as an instruction to move up or down a menu hierarchy. It will, however, be appreciated the specific actions to be undertaken based on determined touch positions/movements will be entirely a matter of the specific implementation at hand (i.e. whatever it is that is being controlled).

It will also be appreciated that, depending on aspects of the desired implementation, further control input(s) may be provided. For example, an upper surface of the cylindrical sensing surface represented in FIG. 6B might be provided with a separate capacitive sensor that may be used as a "select" type button. Thus, a user might navigate a menu by moving a finger around the control knob and then select an option by pressing the top of the control knob.

In this regard, it will be appreciated that a user applying a "twisting" motion around the cylindrical sensing surface in the manner as he might move a conventional control knob may generally contact the sensing surface at multiple locations, for example locations corresponding to a thumb and a forefinger. Conventional "multi-touch" techniques can be used to establish the separate movements of multiple touches, and any one of them, or an average of them, maybe used to provide the desired measurement of angular rotation/height of a touch on the sensing surface.

Thus, in accordance with embodiments of the invention, a "closed curve" sensing surface can be provided without the edge effects discussed above associated with wrapping a conventional electrode pattern around a cylinder. One significant effect of this is a conventional "off the shelf" controller can be used to govern the touch sensor and to provide an indication of a reported touch position which can readily be converted to a position on the three-dimensional sensing surface. Another significant aspect of electrode pattern designs of the type shown in FIGS. 6A and 6C in accordance with embodiments of the invention is that the drive and receive electrodes feed out from a common edge of the sensing surface (i.e. the upper edge shown in FIG. 6A). This greatly simplifies how the electrodes can be connected to external circuitry, such as the controller. In particular, and in contrast to the representation of FIG. 4, there is no need to establish traces to connect to the electrodes within the cylindrical sensing surface. Typically for a "control knob" implementation it might be logical for the electrode pattern to be arranged such that the traces to the electrodes lead out from the edge which joins a mounting surface for the control knob. However, the traces could also lead out towards the top of the control knob and return to the mounting surface through a channel within the knob.

FIGS. 8A and 8B are similar to, and will be understood from, FIGS. 7A and 7B but represent a different example physical path 802 for an object moving within the physical sensing surface of the touch sensor represented in FIGS. 6A to 6C and the corresponding reported path 801 according to the controller.

The physical path 802 in this example is generally parallel to the short edges of the rectangular sensing area (i.e. at fixed $x_p$ in the physical Cartesian coordinate system defined relative to the "unrolled" sensing surface) and moves over approximately three quarters of the extent of the sensing surface. In terms of the movement of a user's finger adjacent the actual sensing area in its cylindrical form (e.g. as shown in FIG. 6C), this movement corresponds with a user dragging a finger vertically up the side of the sensing surface at a fixed azimuth. Providing a response to this action may be seen as a touch-sensor equivalent of a mechanical control knob which can be pushed or pulled, as well as rotated. As can be seen in FIG. 8B, this movement appears as a radial movement within a reported polar coordinate system derived from reported Cartesian coordinates defined relative to the electrodes as discussed above. This demonstrates how the radial component of the reported polar coordinate readily derived from the reported Cartesian coordinates corresponds with an estimated "height" of a touch on the sensing surface in a longitudinal direction.

FIGS. 9A and 9B are similar to, and will be understood from, FIGS. 7A and 7B but represent yet another example physical path 901 for an object moving within the physical sensing surface of the touch sensor represented in FIGS. 6A to 6C and the corresponding reported path 902 according to the controller.

The physical path 902 in this example is generally parallel to the long edges of the rectangular sensing area (i.e. at fixed $y_p$ in the physical Cartesian coordinate system defined relative to the "unrolled" sensing surface). This is similar to the path represented in FIG. 7A, except in FIG. 9A the path extends from one edge of the sensing area across the full width of the sensing area to an opposing edge. In terms of the movement of a user's finger adjacent the actual physical sensing area this movement corresponds with a user dragging a finger a complete revolution around the sensing surface at a fixed height. As represented in FIG. 9B, this movement appears as circular movement within a reported polar coordinate system derived from reported Cartesian coordinates defined relative to the electrodes as discussed above. This shows how an object making a complete revolution of the sensing surface (i.e. corresponding to a complete turn of the rotary knob) corresponds with a continuous circle in reported coordinate space, without crossing any edges. That is to say, unlike a conventional arrangement in which a regular grid of electrodes are formed into a cylinder, there is no need to account for a touch leaving one side of the sensor and appearing at the opposing side at the join. This is because with a curved-electrode arrangement in accordance with embodiments of the invention object positions along a line across the full extent of the sensing surface form a closed path within the reported coordinate system defined relative to the electrodes. It will, however, be appreciated that a full revolution around the sensing surface will strictly form a closed path only if the height of the touch at the beginning and end is the same. A path which tracks at an angle across the sensing surface (i.e. a revolution of the control knob with increasing height) will appear as a spiral in reported coordinate space, as schematically represented in FIGS. 10A and 10B.

Whilst the above examples have focused on a specific electrode pattern, it will be appreciated that various other patterns containing curved electrodes may be employed in other indentations.

For example, FIGS. 11A and 11B are similar to, and will be understood from, FIGS. 7A and 7B but show an example in which the sensor electrode pattern is in effect truncated so that a strip along the top and a strip along the bottom are missing. This sensor is thus restricted to measuring reported touch positions within a reduced radial range in the polar coordinate system associated with the reported space coordinate system as represented in FIG. 11B by the non-hatched portion. In effect the region of the sensing surface covered by the sensing nodes 1, 6, 15, 16, 21, 22, 31 and 36 in the example sensor represented in FIG. 6A are "missing" for the sensor electrode pattern of FIG. 11A. Although this "truncated" approach has a restricted range of sensing (i.e. a reduced height range that can be sensed on the cylindrical surface, it can in some cases be a preferred approach since those parts of the sensor in which the sensing nodes are most separated on the physical sensor (i.e. towards the top and bottom), and hence where the sensing accuracy is lowest, are not used.

Furthermore, whilst the above examples have focused on a cylindrical sensing surface, similar principles may be applied for other shapes of sensing surface. For example, FIGS. 12A and 12B are similar to, and will be understood from, FIGS. 7A and 7B, but represent a sensing surface configured to form a "cone" like physical sensor. Thus, the "unrolled" representation of the sensing surface has an arcuate wedge shape such that when straight edges 1201, 1202 are joined, a cone-like sensing surface is provided having a base circumference 1204. Aspects of the electrode design on the arcuate wedge shape sensing surface are similar to those of FIG. 6A, i.e. the respective drive and receive electrodes are curved with their respective ends meeting a common edge of the sensing surface (corresponding to the base of the cone in this example) and the electrodes broken across the join become continuous when assembled into a cone form (although again the electrode pattern may be applied directly to a 3D surface without joins). In a similar manner to that described above for the cylindrical sensing surface, a movement around a full circumference of the cone at a fixed height will be reported as a circular motion within the coordinate system defined relative to the electrodes represented in FIG. 12B. An object tracking around the base of the cone will appear in the coordinate system defined relative to the electrodes as an object moving a circle 1205. An object moving vertically up the cone, without changing azimuth, will be reported as an object moving radially within a reported polar coordinate system defined relative to the electrodes.

Of course there are many other shapes and configurations which can be conceived of which are based on the principles underlying the above-described embodiments, and in particular the principle of providing curved electrodes within a sensing surface such that object positions along a straight line on the sensing surface are reported as positions around a curve by a controller coupled to the electrodes and configured to provide an indication of a touch position relative to the electrodes.

For example, touch controllers typically interpolate touch positions by taking into account the signals from several neighbouring electrode nodes. For conventional electrode designs with linear, parallel electrodes, the nodes are regularly spaced at a pitch typically designed to facilitate accurate interpolation for the implementation at hand. In embodiments of the current invention electrode nodes are not generally equally spaced and so the accuracy of interpolation may not be the same in the vicinity of different nodes. If this is considered an issue the shape of the electrodes may be varied from node to node so the range of interpolation accuracies throughout the sensor is improved. One way to do this may be to make the electrodes wider for nodes that are more widely spaced, although there are various other modifications that can achieve the same goal of reducing variations in position sensing accuracy across a sensing surface due to variations in node/electrode spacing. For example, in some embodiments each electrode might consist of two quasi-parallel wires which vary in their spacing FIG. 13 schematically shows some components of a touch sensor 1300 according to an embodiment of the invention. The sensor 1300 comprises a sensing surface 1302, for example in accordance with any of the embodiments of the invention such as discussed above, coupled to a controller chip 1304. The controller chip 1304 may, for example, be a conventional "off the shelf" controller chip configured to determine the occurrence of and report a location of a touch using conventional capacitive sensing techniques. The sensor 1300 further comprises a processor 1306 arranged to receive a reported position estimate from the controller 1304 and to convert the reported position estimate to a physical position estimate in accordance with the above-describe techniques. The processor 1306 may, for example, comprise a suitably programmed general purpose microprocessor, or field programmable gate array, or an application specific integrated circuit. Furthermore, although presented in FIG. 9 as two separate elements, it will be appreciated the functionality of the controller 1304 and the processor 1306 may be provided in a single element, for example, a single suitably-programmed microprocessor.

It will be appreciated that whilst the above-described examples have focused on an electrode pattern comprising six drive and six receive electrodes, this is purely for the sake of example, and in general there could of course be any number of electrodes, as with conventional sensing techniques.

Whilst the above-described embodiments of the invention have primarily focused on touch sensors employing capacitive sensing technologies, and in particular those based on driven and receive electrode based technologies (mutual-capacitance), it will be appreciated that similar considerations apply for sensors employing other capacitive sensing technologies (such as self-capacitance based sensors) or, indeed, touch sensors based on other technologies, such as resistive screen sensors. More generally, embodiments of the invention can be applied to any sensor technology in which sensing is performed by measuring an electrical parameter associated with electrodes. This is because embodiments of the invention may in some respects be seen as being based on providing a "distorted" electrode pattern to provide a spatial mapping between a physical touch position and a reported touch position which is nonlinear, and this principle applies regardless of the underlying technology for establishing the reported touch position.

Thus a touch-sensitive position sensor has been described. The sensor comprises an array of first electrodes and an array of second electrodes arranged to cross one another in a pattern to define a sensing surface. The sensing surface has a rectangular shape which is formed into a cylinder such that first and second opposing edges of the sensing surface are adjacent one another. A controller is coupled to respective ones of the first electrodes and the second electrodes and arranged to measure changes in an electrical parameter, e.g. capacitance or resistance, associated with the first and second electrodes caused by the presence of the object adjacent the sensing surface. The controller is further operable to determine a reported position for the object from these measurements in a coordinate system defined relative to the electrodes. At least some of the electrodes are arranged to follow paths which are non-linear within the sensing surface such that object positions along a straight line between the first and second opposing edges on the sensing surface correspond with reported positions along a closed curve in the coordinate system defined relative to the electrodes. Thus, a continuous movement around a circumference of the cylindrical sensing surface is reported as a continuous movement around a closed path in the coordinate system defined relative to the electrodes.

The invention claimed is:

1. A touch-sensitive position sensor comprising:
an array of first electrodes and an array of second electrodes arranged in a pattern to define a sensing surface; and
a controller coupled to respective ones of the first electrodes and the second electrodes and arranged to determine a reported position for an object adjacent the sensing surface in a coordinate system defined relative to the first electrodes and the second electrodes by measuring changes in an electrical parameter associated with the first electrodes and the second electrodes which is caused by the presence of the object; and
wherein at least some of the first electrodes and the second electrodes are arranged to follow paths which are non-linear within the sensing surface such that object positions along a straight line on the sensing surface correspond with reported positions along a curve in the coordinate system defined relative to the first electrodes and second electrodes,
wherein opposing ends of respective ones of the first electrodes meet a common edge of the sensing surface and/or opposing ends of respective ones of the second electrodes meet a common edge of the sensing surface
wherein the first electrodes and second electrodes are arranged such that object positions along a straight line from one edge of the sensing surface to an opposite edge of the sensing surface correspond with reported positions along a path comprising a revolution about an origin at the centre of the coordinate system defined relative to the first electrodes and second electrodes;
wherein the coordinate system defined relative to the first electrodes and second electrodes is a Cartesian coordinate system and the controller is further operable to transform a reported position in this Cartesian coordinate system to reported position in a polar coordinate system, and
wherein the origin at the centre of the coordinate system defined relative to the first electrodes and second electrodes directly corresponds with an azimuthal position around the sensing surface and a height along the sensing surface.

2. A touch-sensitive position sensor according to claim 1, wherein the path comprising a revolution about an origin in the coordinate system defined relative to the first electrodes and second electrodes is a closed path.

3. A touch-sensitive position sensor according to claim 1, wherein the first electrodes and second electrodes are arranged such a straight line on the sensing surface intersects with respective ones of the first electrodes and second electrodes at more than one location.

4. A touch-sensitive position sensor according to claim 1, wherein opposing ends of respective ones of the first electrodes and opposing ends of respective ones of the second electrodes meet a common edge of the sensing surface.

5. A touch-sensitive position sensor according to claim 1, wherein respective ones of the first electrodes and/or respective ones of the second electrodes are generally U-shaped within the sensing surface.

6. A touch-sensitive position sensor according to claim 1, wherein object positions along another straight line on the sensing surface correspond with reported positions along a straight line in the coordinate system defined relative to the first electrodes and second electrodes.

7. A touch-sensitive position sensor according to claim 1, wherein the polar coordinate system has an origin within the Cartesian coordinate system.

8. A touch-sensitive position sensor according to claim 1, wherein the sensing surface is curved to form a three-dimensional shape.

9. A touch-sensitive position sensor according to claim 1, wherein the sensing surface comprises a generally rectangular-shaped surface formed into a cylinder with a first edge of the sensing surface adjacent an opposite edge of the sensing surface.

10. A touch-sensitive position sensor according to claim 1, wherein the sensing surface comprises a generally wedge-shaped surface formed into a cone with a first edge of the sensing surface adjacent an opposite edge of the sensing surface.

11. A touch-sensitive position sensor according to claim 1, wherein the electrical parameter relates to a capacitive coupling associated with the respective electrodes.

12. A touch-sensitive position sensor according to claim 11, wherein the capacitive coupling is a capacitive coupling between respective ones of the first electrodes and respective ones of the second electrodes.

13. A touch-sensitive position sensor according to claim 1, wherein the electrical parameter relates to a resistance associated with the electrodes.

14. A method of sensing a position of an object adjacent a sensing surface comprising:

providing an array of first electrodes and an array of second electrodes arranged in a pattern on the sensing surface;

determining a reported position for the object in a coordinate system defined relative to the first electrodes and the second electrodes by measuring changes in an electrical parameter associated with the first electrodes and the second electrodes caused by the presence of the object, wherein at least some of the first electrodes and the second electrodes are arranged to follow paths which are non-linear within the sensing surface such that object positions along a straight line on the sensing surface correspond with reported positions along a curve in the coordinate system defined relative to the first electrodes and second electrodes, wherein opposing ends of respective ones of the first electrodes meet a common edge of the sensing surface and/or opposing ends of respective ones of the second electrodes meet a common edge of the sensing surface;

wherein the first electrodes and second electrodes are arranged such that object positions along a straight line from one edge of the sensing surface to an opposite edge of the sensing surface correspond with reported positions along a path comprising a revolution about an origin at the centre of the coordinate system defined relative to the first electrodes and second electrodes;

wherein the coordinate system defined relative to the first electrodes and second electrodes is a Cartesian coordinate system and the controller is further operable to transform a reported position in this Cartesian coordinate system to reported position in a polar coordinate system, and wherein the origin at the centre of the coordinate system defined relative to the first electrodes and second electrodes directly corresponds with an azimuthal position around the sensing surface and a height along the sensing surface.

* * * * *